US006763064B1

(12) United States Patent
Graf et al.

(10) Patent No.: US 6,763,064 B1
(45) Date of Patent: Jul. 13, 2004

(54) BLOCK DECISION DIRECTED EQUALIZATION METHOD AND APPARATUS

(75) Inventors: Joseph T. Graf, Robins, IA (US); Thomas L. Tapp, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 691 days.

(21) Appl. No.: 09/666,245

(22) Filed: Sep. 21, 2000

(51) Int. Cl.$^7$ ................................................ H03H 7/30
(52) U.S. Cl. ................................ 375/230; 375/254
(58) Field of Search ............................. 375/230–254, 375/229; 708/323

(56) References Cited

U.S. PATENT DOCUMENTS

| | | | | |
|---|---|---|---|---|
| 4,027,258 A | * | 5/1977 | Perreault | 333/18 |
| 4,038,536 A | * | 7/1977 | Feintuch | 708/322 |
| 4,058,713 A | * | 11/1977 | DiToro | 708/305 |
| 4,365,338 A | * | 12/1982 | McRae et al. | 375/230 |
| 5,436,929 A | | 7/1995 | Kawas Kaleh | 375/233 |
| 5,790,598 A | | 8/1998 | Moreland et al. | 345/233 |

OTHER PUBLICATIONS

F.M. Hsu, "Data Directed Estimation Techniques For Single–Tone HF Modems," IEEE MILCOM, 12.4.1–12.4.10, 1985.*
S.N. Crozier et al. "Reduced Complexity Short–Block Data Detection Techniques for Fading Time–Dispersive Channels," IEEE Transactions on Vehicular Technology, vol. 41, No. 3, pp. 255–265, Aug. 1992.*
F. M. Hsu, "Data Directed Estimation Techniques For Single–Tone HF Modems," IEEE MILCOM, 12.4.1–12.4.10, 1985.
G.K. Kaleh, "Channel Equalization for Block Transmission Systems," IEEE Journal on Selected Areas in Communications, vol. 13, No. 1, pp. 110–121, 1995.
S. N. Crozier, D. D. Falconer and S. A. Mahmoud, "Reduced Complexity Short–Block Data Detection Techniques for Fading Time–Dispersive Channels," IEEE Transactions on Vehicular Technology, vol. 41, No. 3, pp. 255–65, Aug. 1992.
Co–pending patent application Docket No. 00CR003/KE entitled "Block Decision Feedback Equalization Method And Apparatus" filed on an even date, inventor T. Tapp et al.

* cited by examiner

Primary Examiner—Stephen Chin
Assistant Examiner—Cicely Ware
(74) Attorney, Agent, or Firm—Nathan O. Jensen; Kyle Eppele

(57) ABSTRACT

A method and apparatus for receiving data over a dispersive media is disclosed. The received signal is composed of an unknown data segment preceded and followed by known data segments. A replica of each known data segment is generated by the communication apparatus. Channel characteristics existing at the time of transmission of the known data segments are estimated by comparing the known data segments with the replica. Using estimations of the channel characteristics, symbols of the unknown data segment can be determined. Decisions can be made on the various unknown symbols as they are analyzed. Channel characteristics can be re-estimated after determining each symbol, each pair of symbols or each group of symbols. Two solutions of the unknown symbols can be combined in various ways to arrive at a final determination of the unknown transmitted symbols.

20 Claims, 6 Drawing Sheets

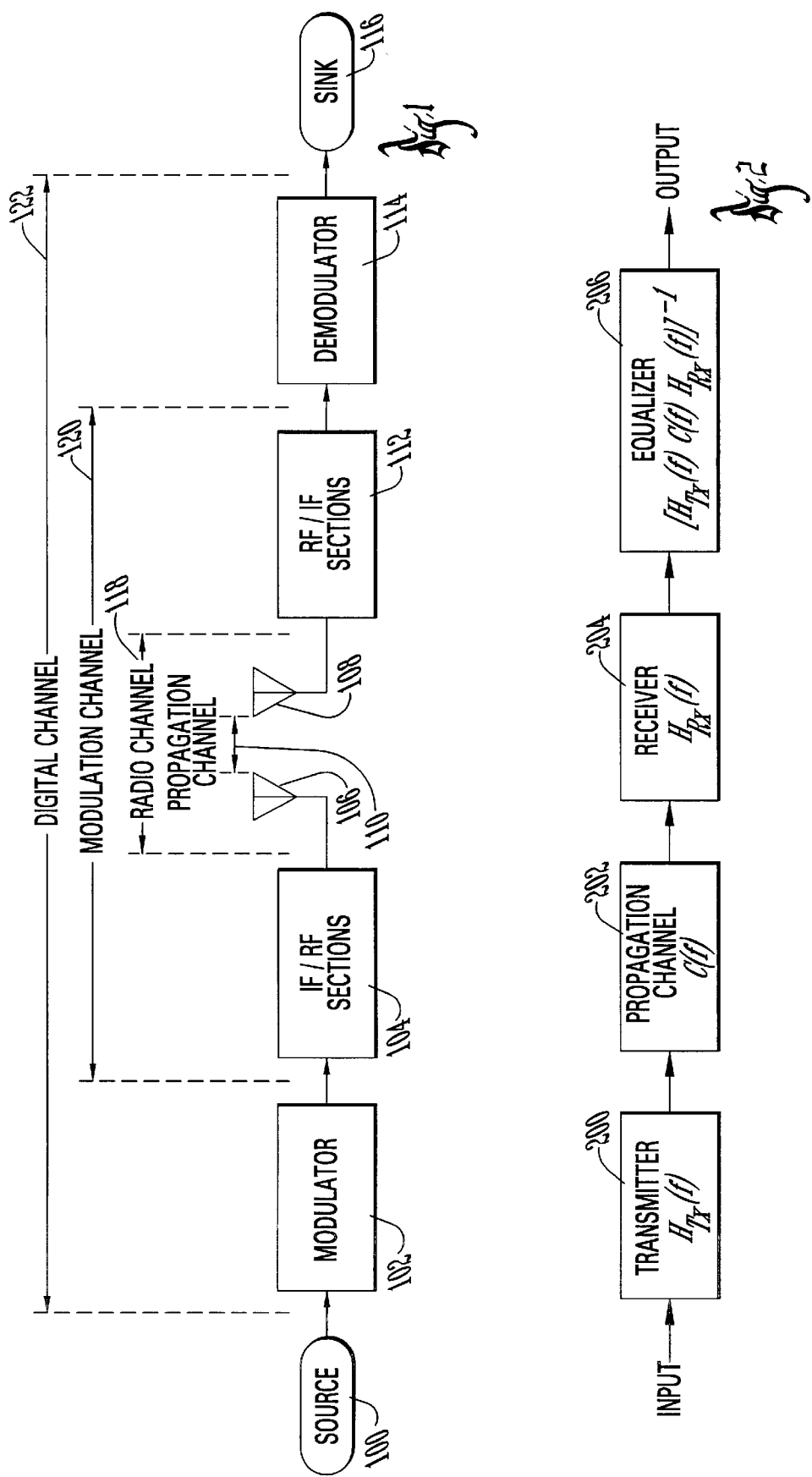

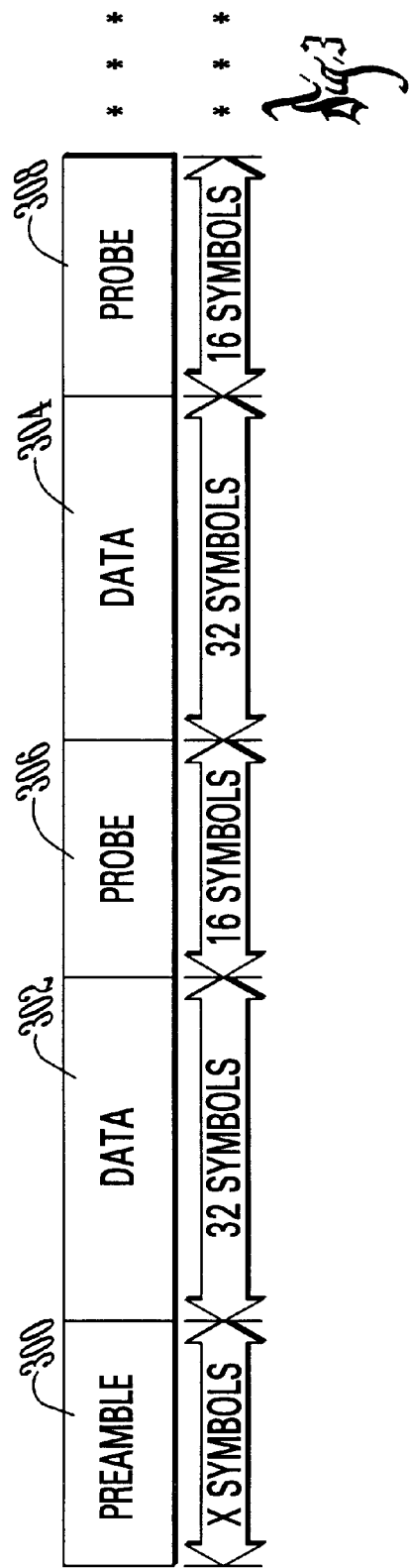

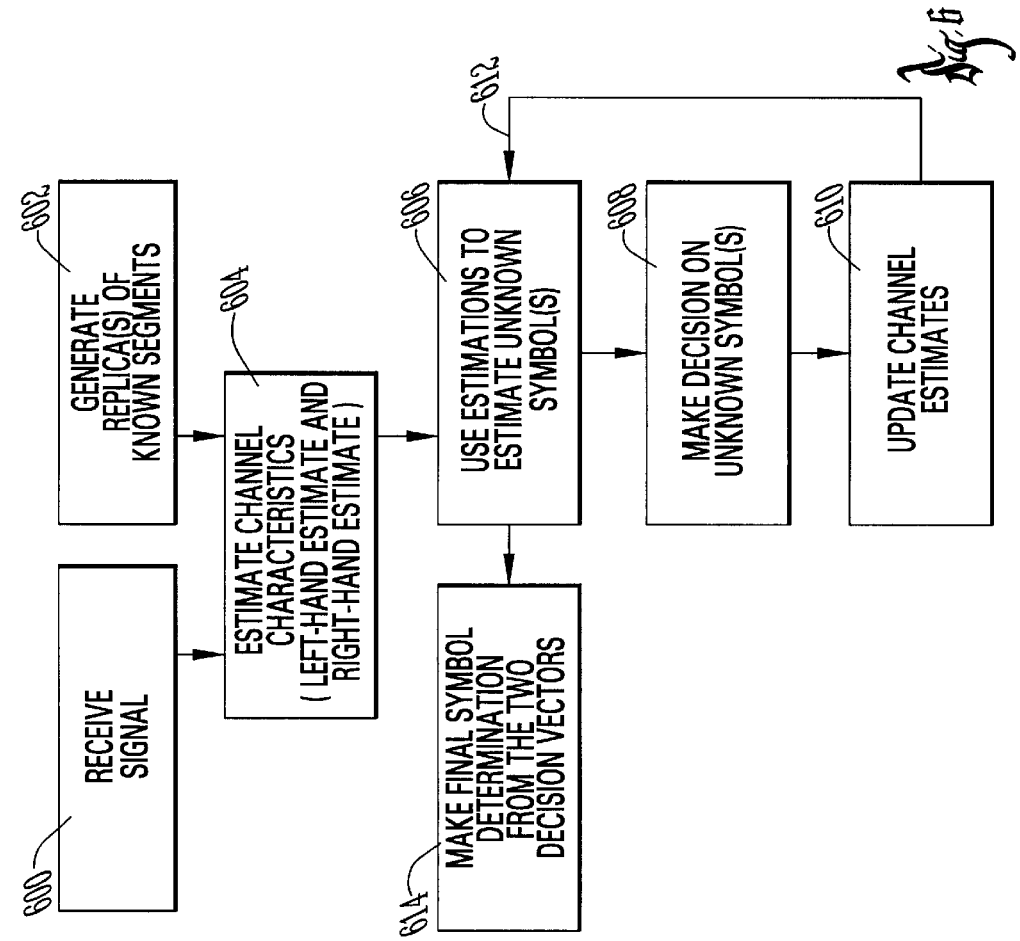
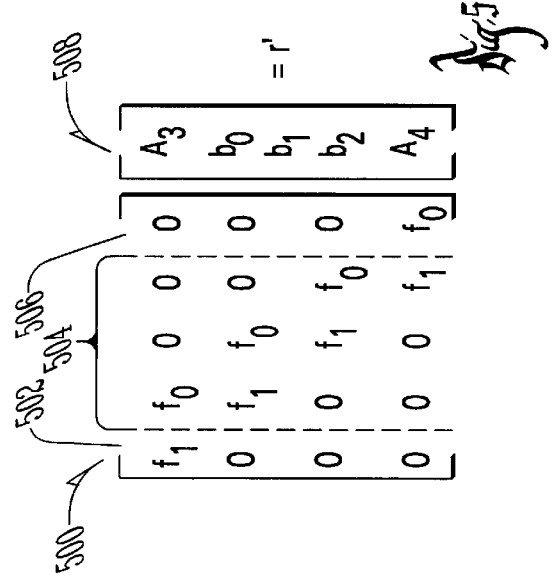

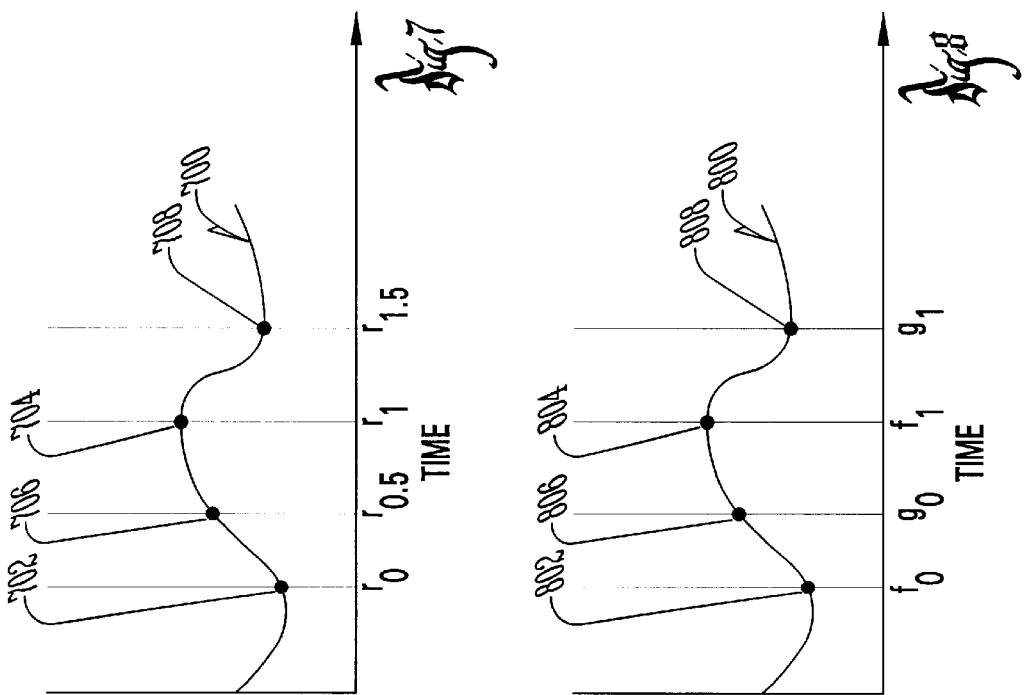

Fig. 10

BLOCK DECISION DIRECTED EQUALIZATION METHOD AND APPARATUS

CROSS REFERENCE TO RELATED APPLICATIONS

Cross-reference is made to a related U.S. patent application by Thomas L. Tapp and Joseph T. Graf, filed on even date herewith, and entitled "Block Decision Feedback Equalization Method and Apparatus."

FIELD OF THE INVENTION

The present invention generally relates to an improved data communication system and technique, more particularly relates to an improved equalization scheme for a digital communication system, and even more particularly relates to block decision directed equalization of signals transmitted via a dynamic dispersive media.

BACKGROUND OF THE INVENTION

Equalization is a technique often used in wireless communication applications. For example, when digital data is transmitted over a dispersive radio channel, an equalizer can be used to improve the estimate of the originally transmitted symbols. More particularly, equalizers are becoming increasingly important in high frequency (HF) communication applications. Such applications are requiring increasingly higher data rates in a fixed bandwidth; i.e. increased bandwidth efficiency. For example, many current applications require performance sufficient to meet the specifications for a 64-QAM (quadrature-amplitude modulation) signal.

As bandwidth efficiency is increased, however, information reliability is typically reduced. The reduction in reliability results, at least in part, from various channel effects. Equalization techniques can be used to mitigate many of the various channel effects. Use of an equalization technique can thereby make the communication system more reliable.

Several different channel effects can cause a reduction in reliability. A description of some of the various channel effects follows. Constrained channel bandwidth, for example, can cause time dispersion and intersymbol interference (ISI). Thermal noise and interference can lower the signal-to-noise ratio and thereby impact performance. Multipath interference can cause fading and time dispersion. Fading can also result from the physical characteristics of the communication channel being used. Delay and Doppler shift, which also result from the physical characteristics of the communication channel being used, can cause, respectively, time and frequency shifts.

Transmitter and receiver characteristics, which also affect the signal, must be accounted for as well. For example, the transmitter can include transmit filters and automatic level control (ALC). Likewise, the receiver can include receive filters and automatic gain control (AGC). These system influences should be addressed since they are also included in the channel response of any real system.

The equalizer's role is to compensate for such effects. FIG. 1 depicts a block diagram of a basic communication system. Data from a source 100 is fed to a modulator 102 that in turn passes the modulated data to a wireless communication component 104. The communication signal is then transmitted by a transmitter antenna 106 to a receiver antenna 108. The link between the two antennas 106, 108 is known as the propagation channel 110. The receiver antenna 108 passes the received signal to the receiver's wireless communication component 112 that in turn sends the signal to a receiver-based demodulator 114. The demodulated signal is then sent for further processing, handling or storage as represented by sink 116.

The channel between the two wireless communication components 104, 112 is known as the radio channel 118. The channel between the modulator 102 and the demodulator 114 is known as the modulation channel 120. The channel between the source 100 and the sink 116 is known as the digital channel 122. The equalizer typically compensates for the influences found across the modulation channel 120. Thus, when used for such a purpose, it can be used to compensate for the channel and system effects described above.

FIG. 2 depicts a use of an equalizer as a filter compensating for the effects influencing the modulation channel. The effects of the transmitter 200 can be represented as $H_{Tx}(f)$. The effects of the propagation channel 202 can be represented as $C(f)$. The effects of the receiver 204 can be represented as $H_{Rx}(f)$. For example, the ideal response of a linear equalizer 206 can be represented as a filter that mitigates the effects of the modulation channel by having a response such as $[H_{Tx}(f)\ C(f)\ H_{Rx}(f)]^{-1}$.

Typical equalizer implementations require knowledge of the characteristics of the communication channel. Several different techniques have been used to estimate or model these characteristics. For example, the initial channel characteristics can be estimated using a training sequence. The estimate can then be updated using a least-mean squares (LMS) algorithm or a recursive-least squares (RLS) algorithm. Another technique employs periodically inserted correlator probes, which are used to guide the channel updates. Further, use of a carefully designed probe can enable an efficient estimation of the channel characteristics. One example of such a probe is provided in the MIL-STD-188-110B Appendix C standard, wherein a simple correlator is used to obtain the channel estimate.

An example of a typical signaling sequence is depicted in FIG. 3. An initial preamble 300 of "x" symbols is used for acquisition and synchronization. In this example, the data packets 302, 304 each include thirty-two unknown symbols. The probes 306, 308 each include a sequence of sixteen known symbols. Alternatively, different numbers of symbols can be communicated in the unknown data segments 302, 304 and probes 306, 308. For example, in the more recently developed MIL-STD-188-110B Appendix C standard, each known probe segment includes thirty-one known symbols and each unknown data segment 302, 304 includes 256 unknown symbols. Each "unknown" data segment 302, 304 is thus encapsulated between two "known" probe packets 300, 306, 308. Various modulation techniques, such as phase-shift keying (PSK), quadrature amplitude modulation (QAM) and quadrature phase-shift keying (QPSK), for example, can be used to transmit the various segments of the signaling sequence.

An example of a communication system using an encapsulated unknown data/known probe approach, such as that depicted in FIG. 3, can be found in U.S. Pat. No. 4,365,338 (Technique For High Rate Digital Transmission Over A Dynamic Dispersive Channel) to McRae et al. In the technique disclosed in U.S. Pat. No. 4,365,338, the channel characteristics are assumed to be fixed over the extent of a given unknown data segment. This approach, however, often does not reflect the true state of the system. In reality, the channel characteristics can vary over time throughout the duration of the data segment, especially as the length of the unknown data segment is increased.

Consequently, there exists a need for an equalization approach that more closely models the real world behavior of the channel characteristics. More particularly, an approach is needed that more fully accounts for the channel characteristic variance present throughout the duration of a data segment. These needs and others are fulfilled by the invention disclosed in the following detailed description.

SUMMARY OF THE INVENTION

It is an object of the present invention to provide an improved equalizer for a communication system transmitting data via a dispersive media.

It is a feature of the present invention to utilize a block equalizer capable of compensating for channel characteristics that vary over the duration of an unknown data segment.

It is an advantage of the present invention to provide a more accurate and realistic estimation of the channel characteristics present over an unknown data segment, thereby increasing reliability in determining the unknown symbols.

Thus, the present invention involves an improved block equalization apparatus and method. It is carried out in a non-restrictive manner in the sense that there are separate solutions that do not directly influence each other's decisions. The channel estimate is not assumed to be constant. The invention can handle environments wherein the channel varies significantly over the duration of the unknown data segment. Further, this approach provides increased flexibility since the estimates can be combined in a variety of different ways.

BRIEF DESCRIPTION OF THE DRAWINGS

The invention may be more fully understood by reading the following description of the invention, in conjunction with the appended drawings wherein:

FIG. 1 is a block diagram of the basic structure of a wireless communication system.

FIG. 2 is a block diagram depicting the some of the basic components of a wireless communication system and the filtering effects associated with those components.

FIG. 3 depicts a waveform having unknown data segments separated by known data segments.

FIG. 5 depicts a matrix equation related to the present invention.

FIG. 6 is a flowchart showing steps involved in at least one embodiment of the present invention.

FIG. 7 depicts an embodiment using a T/2 spaced fractional sampling scheme.

FIG. 8 depicts a channel impulse response estimate with a time resolution of T/2.

FIG. 9 depicts a representation of a matrix for a T/2 spaced fractional sampling scheme.

FIG. 10 depicts another representation of a matrix for a T/2 spaced fractional sampling scheme.

DETAILED DESCRIPTION

Figure 4:
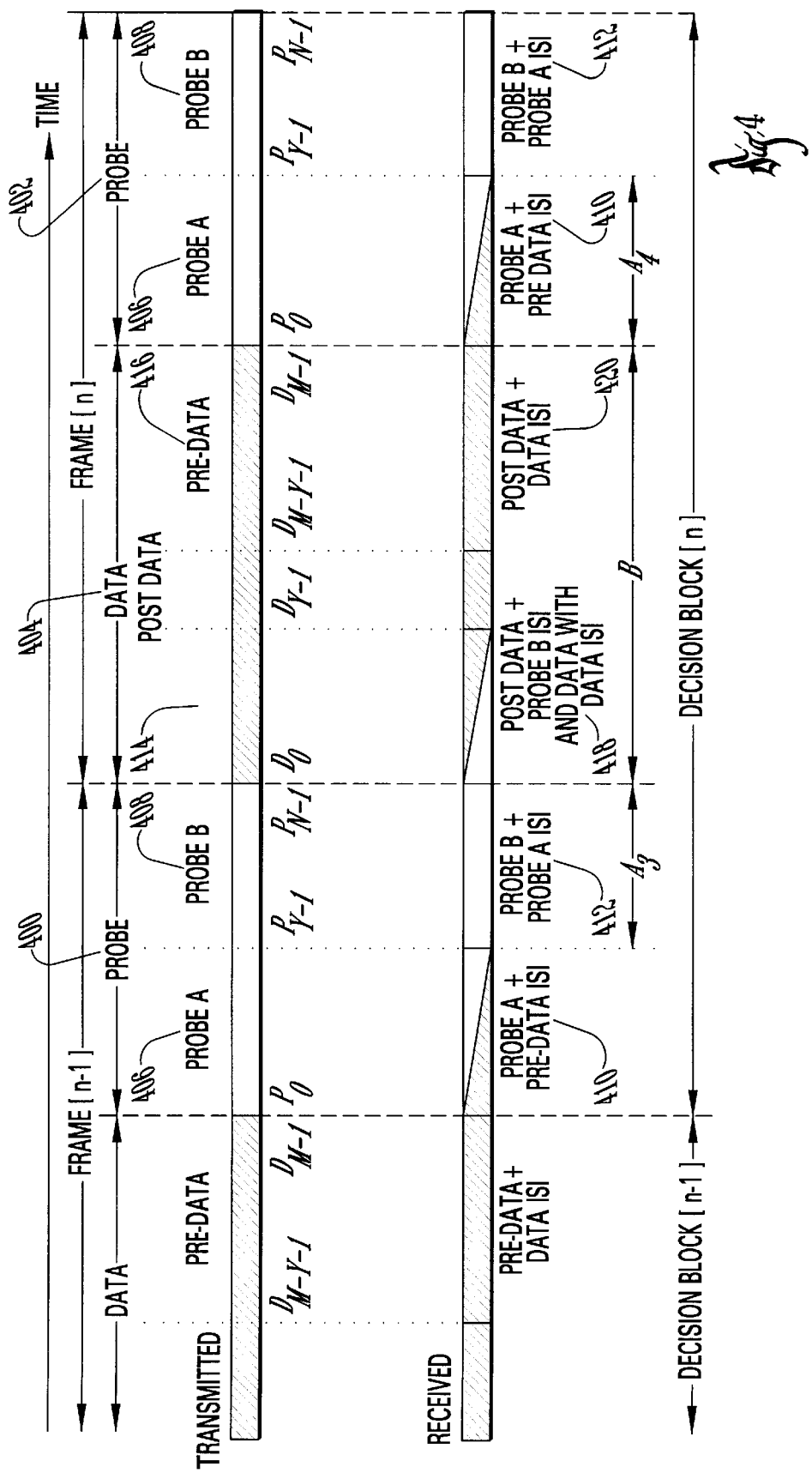
FIG. 4 depicts a more detailed view of a decision block structure having unknown data segments separated by known data segments.

FIG. 4 depicts an embodiment of a decision block structure of a type suitable for use with the present invention. Various known wireless communication components can be used to transmit the data and other information described throughout this specification. Systems such as those outlined in FIGS. 1 and 2, for example, as well as many other known communication systems, can be used in conjunction with the present invention. Such systems typically include a wireless transceiver component and a processing component. Also included is a memory system storing, among other things, received data, data to be transmitted and programs controlling data transmission, data reception and network operations.

The communicated sequence includes alternating blocks of known and unknown symbols such that each unknown data block or segment is both preceded and followed by a segment of symbols that is known to the receiver prior to, or at the time of, reception. For example, in FIG. 4, each known data segment 400, 402 is labeled "probe" and each unknown data segment 404 is labeled simply as "data." A known data segment 400, 402 can be a concatenation of a PROBE A 406 portion (from 0 to Y−2) with a PROBE B portion 408 (from Y−1 to N−1). The variable "Y" is related to the length of the channel impulse response such that Y+1 equals the length of the channel response. In addition, the length of the known data segment is represented as "N" and the length of the unknown data segment is "M" in FIG. 4.

The known and unknown data segments can be further subdivided. Each probe or known data segment can be subdivided into a first portion, "PROBE A" 406, and a second portion, "PROBE B" 408. Further, each PROBE A 406 portion can be subject to ISI 410 from symbols, either preamble symbols or unknown data segment symbols, being transmitted just prior to PROBE A 406. Likewise, each PROBE B 408 portion can be affected by ISI 412 from the PROBE A 406 portion. This effectively isolates the PROBE B portion of the known data segment from the channel effects of the preceding decision block (assuming the channel response is no longer than the length of PROBE A). For instance, the PROBE B portion of the known data segment 400 preceding the unknown data segment 404 can be used to determine a channel response for the left-hand side of the decision block and the PROBE B portion of the known data segment 402 following the unknown data segment 404 can be used to determine a channel response for the right-hand side of the decision block.

Similarly, each unknown data segment 404 can, for discussion purposes, be subdivided. In FIG. 4, one portion of each unknown data segment is labeled "post-data" 414 and a latter portion is labeled "pre-data" 416. Each "post-data" 416 portion can be subject to ISI 418 from PROBE B and from other data symbols of the unknown data segment 404. Each "pre-data" portion can be subject to ISI 420 from "post-data" symbols and from other data symbols within the unknown data segment 404.

The present invention takes into consideration the fact that the channel characteristics can vary significantly over the duration of the unknown data segment 404. In a significant departure from the prior approaches, two separate solutions, based on two channel estimates, are derived for the decision block. Prior approaches generally use one channel solution based on an average or interpolated channel estimate.

Block equalization is based on the least-squares solution to the matrix equation $M_1 \hat{B} = C$, where matrix $M_1$ is constructed from the channel estimate, $\hat{B}$ is the unknown data segment to be detected, and the vector C is a function of all of the received samples affected by the unknown data vector B. Pursuant to the present invention, two independent equations are solved: $M_1^{(0)}\hat{B}^{(0)}=C_L^{(0)}$ (Equation 1) and $M_1^{(M-1)}\hat{B}^{(M-1)}=C_R^{(M-1)}$ (Equation 2). The channel estimate determined from the probe preceding the data block can be represented by $f_L^{(0)}$ and the channel estimate determined from the probe following the data block can be represented by $f_R^{(M-1)}$, where the subscript "L" indicates the estimate from the probe next to the left-hand side of the block and the subscript "R" indicates the estimate from the probe bordering the right-hand side. Thus, equations 1 and 2 are based on the two independent channel estimates ($f_L^{(0)}$ and $f_R^{(M-1)}$) derived from the probes on each side of the unknown data segment. As is well known in the art, several different channel estimation algorithms, such as the least squares, LMS, RLS, Fast RLS, and Lattice algorithms, can be used to generate $f_L$ and $f_R$.

In general, using the reversed vector, $$\underline{f}^T = [f_Y, f_{Y-1}, \ldots, f_0],$$

wherein Y is related to the length of the channel response such that Y+1 equals the length of the channel response and the superscript "T" indicates transposition; the convolution can be represented as r'=MB+n or in matrix form as:

$$r' = \begin{bmatrix} \underline{f}^T & & & 0 \\ & \underline{f}^T & & \\ & & \underline{f}^T & \\ & & & \ddots \\ 0 & & & \underline{f}^T \end{bmatrix} \begin{bmatrix} A_3 \\ B \\ A_4 \end{bmatrix} + n$$

where r' consists of all received symbols affected by the unknown data segment B, and n is a vector of additive white Gaussian noise samples. The last "Y" symbols of the preceding probe sequence form the vector $A_3$ (see 408, FIG. 4), while the first "Y" symbols of the trailing probe sequence form the vector $A_4$ (see 406, FIG. 4) These are the probe symbols that cause intersymbol interference (ISI) with symbols in the unknown data segment 404.

The convolution matrix can be partitioned as shown in the equation $$r' = M_1 B + M_2 A_3 + M_3 A_4 + n, \text{ where}$$

$$M_1 = \begin{bmatrix} f_0 & & & 0 \\ f_1 & f_0 & & \\ \vdots & \vdots & \ddots & \\ f_Y & f_{Y-1} & & f_0 \\ & f_Y & & f_1 \\ & & \ddots & \vdots \\ 0 & & & f_Y \end{bmatrix}, ((M+Y) \times M)$$

$$M_2 = \begin{bmatrix} f_Y & f_{Y-1} & \cdots & f_1 \\ & f_Y & & f_2 \\ & & \ddots & \vdots \\ & & & f_Y \\ 0 & & & \end{bmatrix}, ((M+Y) \times Y)$$

$$M_3 = \begin{bmatrix} & & & 0 \\ f_0 & & & \\ & \ddots & & \\ f_1 & f_0 & & \\ \vdots & & \ddots & \\ f_{Y-1} & f_{Y-2} & \cdots & f_0 \end{bmatrix}, ((M+Y) \times Y).$$

The numbers in parentheses indicate the number of rows and columns of the associated matrix. Note that $M_2$ consists of the first "Y" columns of the original convolution matrix, while $M_3$ consists of the last "Y" columns. The $M_1$ matrix consists of the columns located between those columns used for the $M_2$ and $M_3$ matrices.

FIG. 5, for example, depicts a representation of an M matrix 500 and the equation MX=r' wherein Y=1 (and therefore $\underline{f}^T=[f_1, f_0]$). In this example, the first column 502 of the M matrix 500 becomes the $M_2$ matrix, the second through fourth columns 504 become the $M_1$ matrix and the fifth column 506 becomes the $M_3$ matrix. The X matrix 508 is composed of the last Y components of the expected "left-hand" probe, $A_3$, the unknown data segment B (which in this example includes designations for three unknown symbols $b_0$, $b_1$ and $b_2$ to be determined) and the first Y components of the expected "right-hand" probe segment $A_4$. The $A_3$ and $A_4$ probe segments are replicas, generated by the receiving apparatus, of the probes expected to be transmitted in the communication sequence. In some applications, probes $A_3$ and $A_4$ will be congruent (each having the same sequence of symbols), while in other applications they will not be congruent (each being composed of a different sequence of symbols). Further, it will be appreciated that "Y" can be any of several different values and that the actual value used will be a function of the length of the channel response.

FIG. 6 depicts a flowchart of the steps performed to determine the symbols of the unknown data segment. Upon receiving 600 the signals with any of a variety of known, suitable wireless receiver components and generating 602 a replica of the known data segments, such as $A_3$ and $A_4$, the estimations 604 of the channel characteristics at each end of the unknown data segment can be determined (via any of several well known techniques).

The channel estimates are used to construct the $M_2$ and the $M_3$ matrices, which are in turn used to subtract the ISI introduced by the probe symbols. The two separate channel estimates, $f_L^{(0)}$ and $f_R^{(M-1)}$, are used to form the channel matrices for each side and are denoted $M_{2_L}^{(0)}$ and $M_{3_R}^{(M-1)}$, respectively. The "precursor" and "postcursor" ISI is subtracted from the receive vector r' to form $$C = r' - M_2 A_3 - M_3 A_4.$$

Thus, subtracting the precursor and postcursor information from the receive vector r' yields:

$$C_L^{(0)} = r' - M_{2_L}^{(0)} A_{3_L}^{(0)} - M_{3_R}^{(M-1)} A_{4_R}^{(M-1)}, \text{ Equation 3.1, and}$$

$$C_R^{(M-1)} = r' - M_{2_L}^{(0)} A_{3_L}^{(0)} - M_{3_R}^{(M-1)} A_{4_R}^{(M-1)}, \text{ Equation 3.2.}$$

Use of the L and R subscripts serves to keep the analysis of the two solution paths from becoming confused. To build the $C_L$ vector, the detection of the unknown symbols can start at the left-most unknown symbol and proceed toward the right-most symbol. To build the $C_R$ vector, unknown symbol detection can proceed from the right to the left.

Using Equations 3.1 and 3.2, the least squares solutions for $\hat{B}_L^{(0)}$ and $\hat{B}_R^{(M-1)}$ can be obtained 606 from $C_L^{(0)} = M_{1_L}^{(0)} \hat{B}_L^{(0)}$, Equation 4.1, and $C_R^{(M-1)} = M_{1_R}^{(M-1)} \hat{B}_R^{(M-1)}$, Equation 4.2, where $M_{1_L}^{(0)}$ is derived from $f_L^{(0)}$, and $M_{1_R}^{(M-1)}$ is derived from $f_R^{(M-1)}$. The equations lead one to determine the $\hat{B}$ that minimizes the mean-squared error (ignoring noise), $e = (M_1 \hat{B} - C)^{*T}(M_1 \hat{B} - C)$.

The least squares (LS) solution, $\hat{B}$, can be obtained by solving the normal equations $(M_1^{*T} M_1)\hat{B} = M_1^{*T} C$, Equation 5, where the asterisk denotes the complex conjugate; operator and wherein $M_1^{*T} M_1$ has dimension m×m (wherein m equals the number of transmitted symbols). Since each $M^1$ matrix assumes a constant channel, the autocorrelation matrices will be Toeplitz, and thus Equation 5 can be efficiently solved using, for example, Levinson's algorithm. Other algorithms can be used in lieu of Levinson. Next, $\hat{B}_L^{(0)}$ can be used to determine the first unknown data symbol from the left and $\hat{B}_R^{(M-1)}$ to determine the first unknown data symbol from the right.

Further, if desired, advantages can be obtained by modifying the elements of the diagonal of the $M_1^{*T} M_1$ matrix. For example, a value approximately equal to the inverse of the signal-to-noise ratio can be added to each element of the diagonal of the $M_1^{*T} M_1$ matrix. Such a modification can improve the performance of the equalizer in the presence of noise, and also improve the stability of the algorithm used to solve the normal equations.

"Decisions" or determinations 608 can be made as to which of the universe of possible symbols are intended by the detected symbols. The decisions are then treated as extensions of the probe sequence. The left-hand probe is extended toward the right by one symbol and the right-hand probe is extended to the left by one symbol.

In one embodiment, the process is repeated on the newly defined receive vector. Instead of using the original $f_L^{(0)}$ and $f_R^{(M-1)}$ channel estimates, the channel estimates are updated 610 to $f_L^{(1)}$ and $f_R^{(M-2)}$ using an appropriate algorithm. For example, an LMS algorithm or some form of interpolation of the channel response or a combination of such methods can be used.

With the new channel estimates, Equations 3.1 and 3.2 are updated to yield:

$C_L^{(1)} = r' - M_{2_L}^{(1)} A_{3_L}^{(1)} - M_{3_R}^{(M-1)}$ $A_{4_R}^{(M-1)}$, and $C_R^{(M-2)} = r' - M_{2_L}^{(0)} A_{3_L}^{(0)} - M_{3_R}^{(M-2)}$ $A_{4_R}^{(M-2)}$.

The least squares solution can then be obtained from $C_L^{(1)} = M_{1_L}^{(1)} \hat{B}_L^{(1)}$, and $C_R^{(M-2)} = M_{1_R}^{(M-2)} \hat{B}_R^{(M-2)}$.

The process can be repeated 612 until all of the symbols of the unknown data segment have been detected in each direction.

In another embodiment, the channel estimates are updated 610 only after a group of unknown data symbols has been determined 606. Compared to the embodiment presented above wherein the channel estimate is updated each time an unknown data symbol is determined, the "group" embodiment is less computationally intensive. For example, in various embodiments, a new channel estimate is generated only after it has been used to determine two, three, four or even several unknown data symbols. In this embodiment, Equations 3.1 and 3.2 are updated in a manner consistent with the number of unknown symbol determinations being made between each channel estimate update.

Once completed, there are two independent decision vectors that can be combined 614 in some fashion (for example, a linear or some maximal ratio combination) to form a composite decision. In one embodiment, the decision vector related to the left-hand probe is used to determine the unknown data symbols located to the left of the midpoint of the unknown data segment and the decision vector related to the right-hand probe is used to determine the unknown data symbols located to the right of the midpoint of the unknown data segment.

In another embodiment, both decision vectors are used to determine each unknown symbol and a variable weighting is applied to each decision vector based upon the proximity of the unknown symbol to each of the probes. For example, in determining an unknown symbol located closer to the left-hand probe than to the right-hand probe, the determination reached from application of the decision vector related to the left-hand probe can be given greater influence over the final determination of the symbol than the determination reached from application of the decision vector related to the right-hand probe. Similarly, in determining an unknown symbol located closer (more proximate) to the right-hand probe than to the left-hand probe, the determination reached from application of the decision vector related to the right-hand probe can be given greater influence over the final determination of the symbol than the determination reached from application of the decision vector related to the left-hand probe.

If desired, the "weighting" embodiment can be further refined. In certain circumstances it may be advantageous to disregard, or to reduce the influence of, one of the decision vectors. Burst noise, for example, may corrupt symbols adjacent one side of the unknown data segment and thereby corrupt the channel estimate that is derived for the solution from that side. For instance, when the right-hand decision vector has been corrupted, the symbol decisions proximate to the right-hand side can be based on the solution that is proceeding from the left.

In yet another embodiment, for each iteration, the two independent updates to the channel estimate at each end of the unknown data segment can be combined when computing the new values for $C_L^{(i)}$ and $C_R^{(M-i-1)}$. That is, for the first iteration, $C_L^{(1)}$ and $C_R^{(M-2)}$ are updated using $C_L^{(1)} = C_R^{(M-2)} = r' - M_{2_L}^{(1)} A_{3_L}^{(1)} - M_{3_R}^{(M-2)} A^{4R(M-2)}$.

This embodiment can be used to bring improved solutions as it converges upon the symbols closest to the other side of the decision block. The solutions, however, are not as independent.

Any of the equalizers discussed above can alternatively be a T/k-fractionally-spaced equalizer taking more than one sample per transmitted symbol interval (where "k" indicates the number of samples taken per transmitted symbol, and "T" indicates the duration of one symbol interval). In this case, the channel is also estimated to a time resolution of T/k, using one of several well-known techniques.

FIG. 7 depicts the sampling of a portion of a received signal 700 performed in an embodiment using a T/2 spaced fractional sampling scheme. The first sample taken of each transmitted symbol is represented by $r_0$ 702, $r_1$ 704, etc., and the second sample taken of each transmitted symbol is represented as $r_{0.5}$ 706, $r_{1.5}$ 708, etc. (The subscript indicates the number of symbol intervals, T, from the first sample, $r_0$.) Analogously, the T/2 spaced channel impulse response estimate may be separated into the first sample per symbol period and the second sample per symbol period.

FIG. 8 depicts a channel impulse response estimate with a time resolution of T/2. The first coefficient of the channel impulse response in a symbol interval is represented by $f_0$ 802, $f_1$ 804, etc., and the second coefficient of the channel impulse response in a symbol interval is represented as $g_0$ 806, $g_1$ 808, etc., where the subscripts indicate the symbol interval.

FIG. 9 depicts a representation of an M matrix 900 for the T/2 spaced fractional sampling scheme where the length of the channel impulse response is two symbol intervals. This is the set of convolution equations expressed in matrix form. The first column 902 of the M matrix 900 becomes the $M_2$ matrix, the second through fourth columns 904 become the $M_1$ matrix and the fifth column 906 becomes the $M_3$ matrix in the equations presented above.

The $M_1$ matrix is thus modified by interlacing the channel estimates for the first sampling time (f) and the channel estimates for the second sampling time (g). (If more than two samples per symbol (k) are taken, then the channel estimates for these sampling times are interlaced as well.) The r' vector is modified to include all T/2 spaced samples of the received signal. As in the above-described embodiments, the probe induced ISI is calculated using the $M_2$ and $M_3$ matrices and subtracted from r' to yield C. The remainder of the approach proceeds exactly as above, only using the new $M_1$, $M_2$, and $M_3$ matrices and the new r' (and hence C) vectors.

Figure 10:
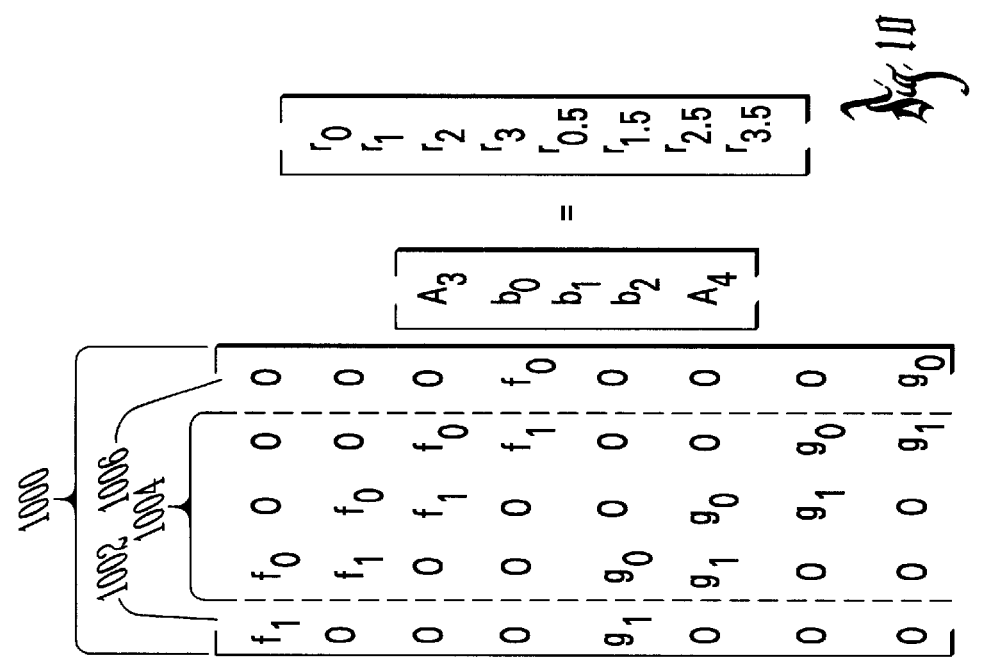

Further, implementation advantages may be obtained by de-interlacing the columns of M and of r' by grouping the rows associated with each sampling time within the symbol interval. For example, the convolution matrix equation represented in FIG. 9 would become the matrix equation of FIG. 10. FIG. 10 depicts a representation of an M matrix 1000 for the T/2 spaced fractional sampling scheme. The first column 1002 of the M matrix 1000 becomes the $M_2$ matrix, the second through fourth columns 1004 become the $M_1$ matrix and the fifth column 1006 is again the $M_3$ matrix. Since each row of the M matrix and the associated row of the r' vector represent one arithmetic equation, this rearrangement is merely a reordering of the equations.

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely exemplary embodiments thereof.

What is claimed is:

1. A method of receiving data over a dispersive media, comprising the steps of:
   receiving, by a receiver apparatus, a signal communicated via a dispersive media, the signal comprising an unknown data segment that is preceded by a first known data segment and followed by a second known data segment;
   generating a replica of the first known data segment and the second known data segment;
   estimating channel characteristics existing at the time of transmission of the first known data segment by comparing the received first known data segment with its generated replica;
   estimating channel characteristics existing at the time of transmission of the second known data segment by comparing the received second known data segment with its generated replica; and
   using the estimation of the channel characteristics existing at the time of transmission of the first known data segment to estimate at least one symbol of the unknown data segment and using the estimation of the channel characteristics existing at the time of transmission of the second known data segment to estimate at least one symbol of the unknown data segment.

2. The method of claim 1, further comprising the step of making a decision on the at least one symbol estimated pursuant to the channel characteristics estimated to exist at the time of transmission of the first known data segment.

3. The method of claim 1, further comprising the step of making a decision on the at least one symbol estimated pursuant to the channel characteristics estimated to exist at the time of transmission of the second known data segment.

4. The method of claim 1, further comprising the step of making a decision on the at least one symbol estimated pursuant to the channel characteristics estimated to exist at the time of transmission of the first known data segment, and the step of making a decision on the at least one symbol estimated pursuant to the channel characteristics estimated to exist at the time of transmission of the second known data segment.

5. The method of claim 4, further comprising the step of re-estimating, after the step of making a decision, the channel characteristics.

6. The method of claim 4, wherein decisions are made on a plurality of symbols estimated pursuant to the channel characteristics estimated to exist at the time of transmission of the first known data segment, and wherein decisions are made on a plurality of symbols estimated pursuant to the channel characteristics estimated to exist at the time of transmission of the second known data segment, and further comprising the step of re-estimating the channel characteristics after making the decisions on the plurality of symbols.

7. The method of claim 5, further comprising the step of adding to the first known data segment the decision made on the at least one symbol estimated pursuant to the channel characteristics estimated to exist at the time of transmission of the first known data segment, and the step of adding to the second data segment the decision made on the at least one symbol estimated pursuant to the channel characteristics estimated to exist at the time of transmission of the second known data segment, and wherein the step of re-estimating is accomplished after the steps of adding the decisions.

8. The method of claim 7, further comprising the step of using the re-estimated channel characteristics related to the first known data segment to estimate at least one symbol of the remaining symbols of the unknown data segment, and the step of using the re-estimated channel characteristics related to the second known data segment to estimate at least one symbol of the remaining symbols of the unknown data segment.

9. The method of claim 8, further comprising the step of determining a first solution of all symbols of the unknown data segment with reference to the estimation of channel characteristics related to the first known data segment, and the step of determining a second solution of all symbols of the unknown data segment with reference to the estimation of channel characteristics related to the second known data segment.

10. The method of claim 9, further comprising the step of making a final determination of the symbols of the unknown data segment from the determined first and second solutions.

11. The method of claim 10, wherein said step of making a final determination comprises weighting application of the first solution such that the first solution has a greater influence on the determination of those unknown data segment symbols that are transmitted more proximate the first known data segment and a lesser influence on the determination of those unknown data segment symbols that are transmitted less proximate the first known data segment.

12. The method of claim 11, wherein said step of making a final determination comprises weighting application of the second solution such that the second solution has a greater influence on the determination of those unknown data segment symbols that are transmitted more proximate the second known data segment and a lesser influence on the determination of those unknown data segment symbols that are transmitted less proximate the second known data segment.

13. The method of claim 10, wherein said step of making a final determination comprises accepting only the decisions of the first solution as the final determination of the symbols transmitted during the first half of the unknown data segment and accepting only the decisions of the second solution as the final determination of the symbols transmitted during the second half of the unknown data segment.

14. The method of claim 1, wherein the received signal is subjected to a fractional sampling scheme.

15. A data communication apparatus capable of receiving a signal via a dispersive media, comprising:
a signal receiving component capable of receiving a signal communicated via a dispersive media, the signal comprising an unknown data segment that is preceded by a first known data segment and followed by a second known data segment;
a known signal replicating component capable of generating a replica of the first known data segment and the second known data segment;
a memory system storing data representing the unknown data segment, the first known data segment and the second known data segment, said memory system also storing instructions for estimating channel characteristics existing at the time of transmission of the first known data segment, storing instructions for estimating channel characteristics existing at the time of transmission of the second known data segment, and also storing instructions for using the estimation of the channel characteristics existing at the time of transmission of the first known data segment to estimate at least one symbol of the unknown data segment and for using the estimation of the channel characteristics existing at the time of transmission of the second known data segment to estimate at least one symbol of the unknown data segment; and
a processing component, coupled with said signal receiving component, with said known signal replicating component and also coupled with said memory system, said processing component being capable of executing the instructions for estimating channel characteristics existing at the time of transmission of the first known data segment, being capable of executing the instructions for estimating channel characteristics existing at the time of transmission of the second known data segment, and also being capable of executing the instructions for using the estimation of the channel characteristics existing at the time of transmission of the first known data segment to estimate at least one symbol of the unknown data segment and for using the estimation of the channel characteristics existing at the time of transmission of the second known data segment to estimate at least one symbol of the unknown data segment.

16. The data communication apparatus of claim 15, wherein said memory system also stores instructions for making a decision on the at least one symbol estimated pursuant to the channel characteristics estimated to exist at the time of transmission of the first known data segment, and for making a decision on the at least one symbol estimated pursuant to the channel characteristics estimated to exist at the time of transmission of the second known data segment; and wherein said processing component is capable of executing the instructions for making a decision on the at least one symbol estimated pursuant to the channel characteristics estimated to exist at the time of transmission of the first known data segment, and for making a decision on the at least one symbol estimated pursuant to the channel characteristics estimated to exist at the time of transmission of the second known data segment.

17. The data communication apparatus of claim 16, wherein said memory system also stores instructions for making decisions on a plurality of symbols estimated pursuant to the channel characteristics estimated to exist at the time of transmission of the first known data segment, for making decisions on a plurality of symbols estimated pursuant to the channel characteristics estimated to exist at the time of transmission of the second known data segment, and for re-estimating the channel characteristics after the decisions on the plurality of symbols have been made, and wherein said processing component is capable of executing the instructions for making decisions on a plurality of symbols estimated pursuant to the channel characteristics estimated to exist at the time of transmission of the first known data segment, for making decisions on a plurality of symbols estimated pursuant to the channel characteristics estimated to exist at the time of transmission of the second known data segment, and for re-estimating the channel characteristics after making the decisions on the plurality of symbols.

18. The data communication apparatus of claim 15, wherein said memory system also stores instructions for determining a first solution of all symbols of the unknown data segment with reference to the estimation of channel characteristics related to the first known data segment, and for determining a second solution of all symbols of the unknown data segment with reference to the estimation of channel characteristics related to the second known data segment, and wherein said processing component is capable of executing the instructions for determining a first solution of all symbols of the unknown data segment with reference to the estimation of channel characteristics related to the first known data segment, and for determining a second solution of all symbols of the unknown data segment with reference to the estimation of channel characteristics related to the second known data segment.

19. The data communication apparatus of claim 18, wherein said memory system stores instructions for making a final determination of the symbols of the unknown data segment from the determined first and second solutions, and wherein said processing component is capable of executing the instructions for making a final determination of the symbols of the unknown data segment from the determined first and second solutions.

20. A data communication apparatus capable of receiving a signal via a dispersive media, comprising:

means for receiving a signal communicated via a dispersive media, the signal comprising an unknown data segment that is preceded by a first known data segment and followed by a second known data segment;

means for replicating the first known data segment and the second known data segment;

means for storing information representing the unknown data segment, the first known data segment and the second known data segment, said means for storing information also being for storing instructions for estimating channel characteristics existing at the time of transmission of the first known data segment, for storing instructions for estimating channel characteristics existing at the time of transmission of the second known data segment, and also for storing instructions for using the estimation of the channel characteristics existing at the time of transmission of the first known data segment to estimate at least one symbol of the unknown data segment and for using the estimation of the channel characteristics existing at the time of transmission of the second known data segment to estimate at least one symbol of the unknown data segment; and means for processing, coupled with said means for receiving, with said means for replicating and also coupled with said means for storing, said means for processing being for executing the instructions for estimating channel characteristics existing at the time of transmission of the first known data segment, for executing the instructions for estimating channel characteristics existing at the time of transmission of the second known data segment, and also for executing the instructions for using the estimation of the channel characteristics existing at the time of transmission of the first known data segment to estimate at least one symbol of the unknown data segment and for using the estimation of the channel characteristics existing at the time of transmission of the second known data segment to estimate at least one symbol of the unknown data segment.

\* \* \* \* \*